F. W. DRESSEL.
SIGNAL GLASS HOLDER.
APPLICATION FILED FEB. 24, 1911.
1,073,224.
Patented Sept. 16, 1913.
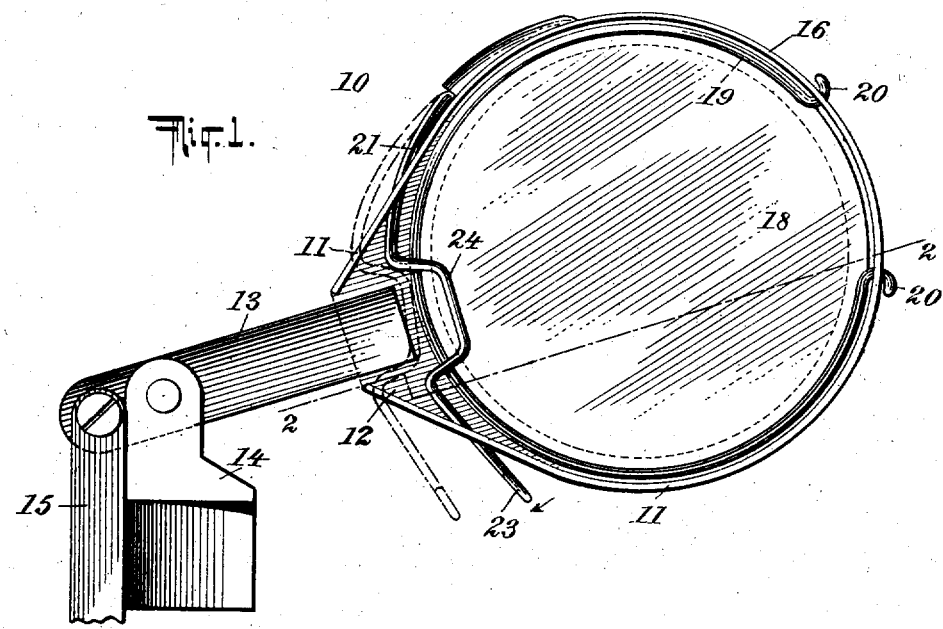
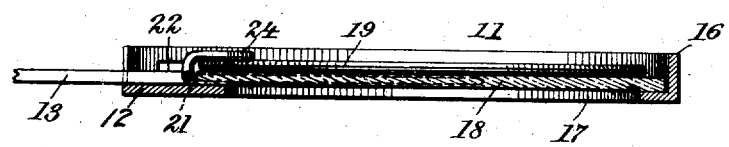
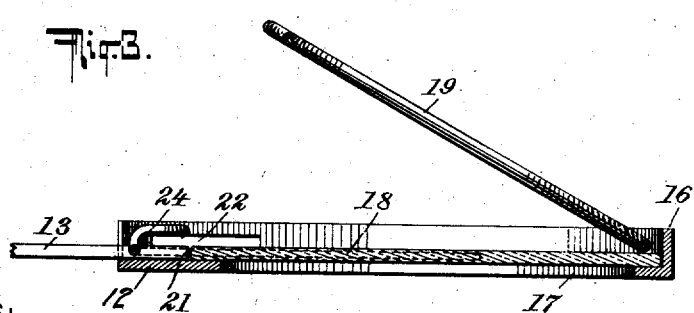
WITNESSES:
Edwin H Dietrich.
Nellie M. Chase
INVENTOR
Frederick W. Dressel
BY
Conrad A Dietrich
his ATTORNEY

UNITED STATES PATENT OFFICE.

FREDERICK W. DRESSEL, OF NEW YORK, N. Y.

SIGNAL-GLASS HOLDER.

1,073,224. Specification of Letters Patent. Patented Sept. 16, 1913.

Continuation of application Serial No. 452,305, filed September 9, 1908. This application filed February 24, 1911. Serial No. 610,493.

*To all whom it may concern:*

Be it known that I, FREDERICK W. DRESSEL, a citizen of the United States, residing at the city of New York, borough of Manhattan, county and State of New York, have invented certain new and useful Improvements in Signal-Glass Holders, of which the following is a full, clear, and exact specification.

My invention relates to improvements in signal lamps, the same being a continuation of my application, Serial No. 452,305 filed September 9, 1908, and has for its object more particularly to provide a simple, efficient and reliable means for securing the colored signal glasses in position within their frames, which are movably supported, and adapted for adjustment into position between the lamp and the lens of the lantern.

Further, said invention has for its object to provide means for securing said colored signal glasses in the holders in such a manner that the same can be easily removed in order to clean the same, or to replace one which has become broken.

Further, said invention has for its object to provide a holder for colored signal glasses, by means of which a signal glass, although broken, or merely cracked, may still be retained duly in shape in a holder, and permit of its being adjusted to operative position without disturbing its function as a signal glass.

To the attainment of the aforesaid objects and ends, my invention consists in the novel details of construction, and in the combination, connection and arrangement of parts hereinafter more fully described, and then pointed out in the claims.

In the accompanying drawings, forming part of this specification, wherein like numerals of reference indicate like parts, Figure 1 is a side view showing a signal glass holder and the means for supporting and operating the same, said holders being provided with one form of securing means constructed according to and embodying my said invention; Fig. 2 is a section taken on the line 2—2 of Fig. 1, showing the signal glass secured in position within the holder, and Fig. 3 is a similar view taken on the same line, showing the securing means raised to permit the removal of the glass therein.

In said drawings 10 designates the signal glass holder comprising a frame 11 made of thin metal or other material, and essentially circular in outline, having a projecting portion 12 at one side whereby said frame may be attached to a supporting arm 13 pivotally mounted in a bearing 14 adapted for attachment to a lantern casing, and 15 denotes a link pivotally secured to the projecting end of said arm 13 whereby said signal glass holder may be shifted into and out of operative position. The frame 11 is provided along its edge with an upwardly projecting flange or rim 16, and at its base with a circular opening 17 to expose a signal glass. 18 denotes a colored signal glass which is secured to the frame within the rim portion 16 thereof and retained in position within said frame over the circular opening 17 by means of a pivoted member 19 formed preferably of a piece of wire corresponding in outline substantially with the colored signal glass and having its ends 20 20 extending through the rim 16 of the frame.

Upon the frame 11 at a point about opposite to that where the hinged section 19 is secured is arranged a spring locking device consisting preferably of a single piece of wire 21 which is secured at one end to the frame 11 along the outer surface of the rim 16 and extends through apertures 22 22 arranged in the rim 16 adjacent to the ends thereof. The free end of the spring locking device 21 is provided with a finger portion 23, and intermediate its free and secured ends said spring member is provided with an offset portion 24 which is adapted for engagement with the upper surface of the hinged member 19 about midway between its pivoted ends.

In order to insert a colored signal glass within the holder 10 it merely becomes necessary to release the locking device by moving the free end 23 thereof in the direction of the arrow at Fig. 1 until the offset portion 24 is free of the hinged member 19. Hereupon the hinged member 19 is raised to the position illustrated at Fig. 3, and the colored signal glass adjusted in position in the frame beneath said hinged member, which is thereupon folded to the position shown at Fig. 2, and the locking device 21 released, which will thereupon return to its normal position with the offset portion 24 in position above the signal glass 18 and the hinged section 19 and assume the position indicated at Fig. 1 and thus hold the parts securedly locked. It will be understood, of course, that the end of the spring locking member 21 may be secured to the frame in any suitable manner besides soldering, as shown in the present instance. Further, it will be noted that by means of the improved construction herein shown and described, the signal glass if broken into several pieces, or merely cracked, may be retained duly in position within the frame and below the hinged section 19 by means of the locking device, since substantially the entire periphery of the signal glass is engaged by the hinged member 19, and thus permit of the same being used without interfering with its function until the same can be replaced with a new one.

Having thus described my invention, what I claim and desire to secure by Letters Patent is:

1. A signal glass holder comprising a frame, a signal glass therein, a hinged member having its end pivotally secured in said frame above said signal glass, and a spring locking device having one end secured to said frame, and its other end free and extending over said frame and provided with an offset portion intermediate its ends adapted to engage said hinged member for securing said signal glass in position within said frame, substantially as specified.

2. A signal glass holder comprising a frame, a signal glass therein, a hinged member consisting of a single piece of wire having its ends pivotally secured within said frame above the signal glass therein, and a spring locking device formed of a single piece of wire having one end secured to said frame, and its other end free and extending over said frame, and an offset portion intermediate its ends adapted to engage said hinged member at a point opposite to its hinged ends for securing said signal glass in position within said frame, substantially as specified.

Signed at the city of New York, in the county and State of New York on the 15th day of October, one thousand nine hundred and ten.

FREDERICK W. DRESSEL.

Witnesses:
JOHN E. MATHEWS,
MINNIE LEWIS.

Copies of this patent may be obtained for five cents each, by addressing the "Commissioner of Patents, Washington, D. C."

---

Correction in Letters Patent No. 1,073,224.

It is hereby certified that Letters Patent No. 1,073,224, granted September 16, 1913, upon the application of Frederick W. Dressel, of New York, N. Y., for an improvement in "Signal-Glass Holders," was erroneously issued to the inventor, said Dressel, whereas said Letters Patent should have been issued to *The Dressel Railway Lamp Works, a corporation of New York*, as shown by the records of assignments in this office; and that the said Letters Patent should be read with this correction therein that the same may conform to the record of the case in the Patent Office.

Signed and sealed this 7th day of October, A. D., 1913.

[SEAL.]

R. T. FRAZIER,
*Acting Commissioner of Patents.* parts securedly locked. It will be understood, of course, that the end of the spring locking member 21 may be secured to the frame in any suitable manner besides soldering, as shown in the present instance. Further, it will be noted that by means of the improved construction herein shown and described, the signal glass if broken into several pieces, or merely cracked, may be retained duly in position within the frame and below the hinged section 19 by means of the locking device, since substantially the entire periphery of the signal glass is engaged by the hinged member 19, and thus permit of the same being used without interfering with its function until the same can be replaced with a new one.

Having thus described my invention, what I claim and desire to secure by Letters Patent is:

1. A signal glass holder comprising a frame, a signal glass therein, a hinged member having its end pivotally secured in said frame above said signal glass, and a spring locking device having one end secured to said frame, and its other end free and extending over said frame and provided with an offset portion intermediate its ends adapted to engage said hinged member for securing said signal glass in position within said frame, substantially as specified.

2. A signal glass holder comprising a frame, a signal glass therein, a hinged member consisting of a single piece of wire having its ends pivotally secured within said frame above the signal glass therein, and a spring locking device formed of a single piece of wire having one end secured to said frame, and its other end free and extending over said frame, and an offset portion intermediate its ends adapted to engage said hinged member at a point opposite to its hinged ends for securing said signal glass in position within said frame, substantially as specified.

Signed at the city of New York, in the county and State of New York on the 15th day of October, one thousand nine hundred and ten.

FREDERICK W. DRESSEL.

Witnesses:
JOHN E. MATHEWS,
MINNIE LEWIS.

Copies of this patent may be obtained for five cents each, by addressing the "Commissioner of Patents, Washington, D. C."

---

Correction in Letters Patent No. 1,073,224.

It is hereby certified that Letters Patent No. 1,073,224, granted September 16, 1913, upon the application of Frederick W. Dressel, of New York, N. Y., for an improvement in "Signal-Glass Holders," was erroneously issued to the inventor, said Dressel, whereas said Letters Patent should have been issued to *The Dressel Railway Lamp Works, a corporation of New York*, as shown by the records of assignments in this office; and that the said Letters Patent should be read with this correction therein that the same may conform to the record of the case in the Patent Office.

Signed and sealed this 7th day of October, A. D., 1913.

[SEAL.]

R. T. FRAZIER,
*Acting Commissioner of Patents.*

It is hereby certified that Letters Patent No. 1,073,224, granted September 16, 1913, upon the application of Frederick W. Dressel, of New York, N. Y., for an improvement in "Signal-Glass Holders," was erroneously issued to the inventor, said Dressel, whereas said Letters Patent should have been issued to *The Dressel Railway Lamp Works, a corporation of New York*, as shown by the records of assignments in this office; and that the said Letters Patent should be read with this correction therein that the same may conform to the record of the case in the Patent Office.

Signed and sealed this 7th day of October, A. D., 1913.

[SEAL.]
R. T. FRAZIER,
*Acting Commissioner of Patents.*